UNITED STATES PATENT OFFICE.

BERNARD McCABE AND ALBERT THAYER, OF BOSTON, MASSACHUSETTS.

METHOD OF MOLDING VEGETABLE FIBROUS MATERIAL.

SPECIFICATION forming part of Letters Patent No. 530,958, dated December 18, 1894.

Application filed February 12, 1894. Serial No. 499,944. (No specimens.)

*To all whom it may concern:*

Be it known that we, BERNARD MCCABE and ALBERT THAYER, of Boston, in the county of Suffolk and State of Massachusetts, have invented certain new and useful Improvements in Methods of Molding Vegetable Fibrous Material, of which the following is a full, clear, and exact description.

This invention has for its object the manufacture of various articles of use, such as tubes, boxes, gears,&c., from vegetable fibrous material, that has been treated with acids substantially in the manner described in Letters Patent of the United States issued to A. T. Schmidt, No. 113,454, dated April 4, 1871, and known generally in the trade as "vulcanized fiber," and this invention consists of the method or mode of making various articles of use of vegetable fibrous material, by first treating the vegetable fibrous material with acid or acids, then forcing the so acid treated fibrous material through suitable openings, or slits, or holes in a head, block or plate, then molding the material in a suitable mold for the article desired, and after the article has been removed from the mold treating it with water all substantially as hereinafter described.

In carrying out this invention any suitable vegetable fibrous material can be used, and it is first placed in any suitable vessel and the whole saturated or treated with acid such as chloride of zinc, tin, calcium, magnesium or aluminium, of the required strength, and subjected to heat substantially as described in said patent, the vegetable fibrous material being stirred and mixed so that all particles of the vegetable fibrous substance are thoroughly treated and acted upon by the acid, and in this state the vegetable fibrous matter is placed in a suitable hollow cylinder having a head, in and through which head is a number, or series of thin narrow slits, or small apertures, or holes, through which the so treated vegetable fibrous material is forced by a suitable plunger, so that after it has passed through the slits or holes it will be in the form of long strips or strings of the vegetable fibrous matter which strips or strings are quite thin and fine respectively, which reduces the vegetable matter to practically long, fine fibers of the material. While in the moist condition from the treatment of the acid and in the strip or string form, these lengths or fibers as it were of the acid treated vegetable fibrous material, are placed in any suitable mold which is designed or intended for the article which is to be made of the material, and with a suitable plunger the mass is compressed firmly in the mold and when fully molded it is removed from the mold and put to soak in or treated with water, in the usual manner of treating such acid treated fibrous material, as described in said patent for sheet form, and then afterward dried.

It is desirable in making the mold for the article for it to be made somewhat larger than the size the article is to be when done, as in the drying of the fibrous material, it shrinks considerably, generally fifty or sixty per cent.

The advantage of this invention in molding vegetable fibrous material, treated with acid, is that the material is in long strips or strings or fibers, which lie together, or side by side, or intermingle with one another in such manner, as to make a union between them, so that as the material shrinks after being molded as described and is dried they all become closely united and homogeneous, and being in lengths they are so tied together as to make the article strong and durable holding together and as firm as when the fibrous material is treated and made in sheet form.

The thinner the strips or smaller the strings of the acid treated fibers, are, the better they will lie and unite together in molding and the stronger will be the article made of them.

If desired the acid treated fibrous material can be forced first through a series of thick slits or large openings, and then through thinner and smaller ones respectively until the desired fineness is accomplished.

The article after being molded can be finished in any suitable manner.

It is not intended to limit this invention to the particular treatment, by acid and water of vegetable fibrous material described in said Letters Patent, as it can be treated by acid and water in ways described in other Letters Patent, or in any of the ways known in the state of the art, for the production of what is generally called vulcanized or laminated fiber, &c.

Having thus described our invention, what we claim is—

The method of molding articles from vegetable fiber consisting in first treating the vegetable fibrous material with acid, then forcing the material so treated through slits, holes or apertures in a suitable head, block or plate, whereby the material is formed into strips or strings, depositing said strips or strings while in a plastic condition in a mold, compressing the same therein, and finally immersing it in water, substantially as described.

In testimony whereof we have hereunto set our hands in the presence of two subscribing witnesses.

BERNARD McCABE.
ALBERT THAYER.

Witnesses:
EDWIN W. BROWN,
LEONA CERITA ARNO.